United States Patent
DeVore et al.

(10) Patent No.: US 7,314,430 B2
(45) Date of Patent: Jan. 1, 2008

(54) DISABLING ENGINE SPEED LIMITERS DURING CENTRIFUGAL CLUTCH INSTALLATION

(75) Inventors: James H. DeVore, Laurinburg, NC (US); Charles E. Allen, Jr., Rochester Hills, MI (US); Winfried Sturmer, Euerbach (DE); Karl-Fritz Heinzelmann, Meckenbeuren (DE); Ludger Ronge, Eriskirch (DE); Loren C. Dreier, Vass, NC (US); Robert A. Sayman, Laurinburg, NC (US); Ronald P. Muetzel, Friedrichshafen (DE); Muneer AbuSamra, Southern Pines, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 230 days.

(21) Appl. No.: 11/282,930

(22) Filed: Nov. 18, 2005

(65) Prior Publication Data

US 2007/0117679 A1 May 24, 2007

(51) Int. Cl.
*B60W 10/02* (2006.01)
*B60W 10/04* (2006.01)

(52) U.S. Cl. ............. 477/181; 192/105 B; 192/105 CP

(58) Field of Classification Search ...................... None
See application file for complete search history.

(56) References Cited

U.S. PATENT DOCUMENTS

| | | | |
|---|---|---|---|
| 6,502,476 B2 | 1/2003 | Genise | |
| 6,539,820 B2 | 4/2003 | Markyvech | |
| 6,561,948 B2 | 5/2003 | Markyvech et al. | |
| 6,571,923 B2 | 6/2003 | Kummer | |
| 6,609,602 B2 | 8/2003 | Gochenour et al. | |
| 6,633,806 B2 | 10/2003 | Gochenour | |
| 6,634,479 B1 | 10/2003 | Kummer et al. | |
| 6,641,504 B2 | 11/2003 | Genise et al. | |
| 6,698,564 B2 | 3/2004 | Kummer et al. | |
| 7,000,751 B2 * | 2/2006 | AbuSamra et al. | ... 192/105 CP |
| 2004/0055851 A1 | 3/2004 | Ishizaka et al. | |
| 2004/0104096 A1 | 6/2004 | Genise | |
| 2004/0216978 A1 * | 11/2004 | Kummer et al. | ........ 192/105 C |
| 2004/0238305 A1 * | 12/2004 | Markyvech et al. | ...... 192/13 R |
| 2005/0199468 A1 * | 9/2005 | Gochenour et al. | ..... 192/105 B |

OTHER PUBLICATIONS

United States Patent Application "Normally Open Clutch Assembly Device", U.S. Appl. No. 10/744,475, filed Dec. 23, 2003.

* cited by examiner

*Primary Examiner*—Sherry Estremsky
(74) *Attorney, Agent, or Firm*—Carlson, Gaskey & Olds

(57) ABSTRACT

A master clutch includes a pressure plate adjacent to a friction disc. A centrifugal weight forces the pressure plate and friction disc into engagement when in a desired install position. A locking device retains the centrifugal weight in the desired installed position. A controller sends an electronic command to a system component, such as an engine, to disengage the locking device. In one example, the electronic command may be an engine speed command that is above an engine speed limit in a normal vehicle operating mode. Commanding the engine to run at a speed greater than the typical engine speed limit moves the centrifugal weight out of the desired installed position making the master clutch operational.

18 Claims, 2 Drawing Sheets

DISABLING ENGINE SPEED LIMITERS DURING CENTRIFUGAL CLUTCH INSTALLATION

BACKGROUND OF THE INVENTION

This invention relates to a method and apparatus for installing a centrifugal master clutch into a vehicle.

Typically, a normally open clutch assembly includes a rotating input member such as a flywheel, that selectively engages one or more friction discs. The friction discs transmit rotation from the flywheel by one or more pressure plates. A transmission input shaft is driven by rotation of the friction discs. A plurality of centrifugal weights are pivotally mounted to move radially outward in response to rotation of the clutch assembly. As the rotational speed of the clutch assembly increases, rollers on the centrifugal weights are forced up a ramped surface to force engagement of the pressure plates with the friction discs and transmit rotational drive to the input shaft.

Installation of a clutch assembly requires proper alignment between the friction discs and the flywheel. Normally closed clutch assemblies use a biasing force that normally clamps the pressure plates against the friction discs to maintain proper alignment during assembly. Disadvantageously, a normally open clutch assembly does not clamp the friction discs until the centrifugal weights are driven outward by rotation of the clutch assembly. Therefore, the friction discs are not held in a desired aligned position during assembly. Some other alignment method is thus necessary for a normally open clutch assembly.

One example alignment device for normally open clutch assemblies include cammed sleeves that are inserted within the clutch assembly to hold the centrifugal weights in a position where the pressure plates hold the friction plates in proper alignment with the flywheel.

The cammed sleeves are costly and time consuming to install and produce. Another known-alignment device utilizes shear pins to retain the centrifugal weights in a desired position. Once the clutch is installed in a powertrain it may be necessary to run the engine at high speeds to make the clutch operational. The high speeds cause the shear pins to break such that the clutch becomes operational. Typically, the end customer of the vehicle receiving the clutch may prefer that the engine be limited to less than full operating speed while at stand still during a normal vehicle operating mode. Limiting engine speed is a common feature for powertrains incorporating progressive shift and vehicle speed sensor anti-tampering. Unfortunately, the limited engine speed may be below what is required to make the clutch operational, for example, below the speed at which the shear pins will break.

Customers typically have the preference of performing powertrain configuration in a different area than where the powertrain is installed onto the chassis. What is needed is a method and apparatus for overriding the normal vehicle operating mode once the powertrain is installed onto the chassis.

SUMMARY OF THE INVENTION

The present invention includes a master clutch having a pressure plate adjacent to a friction disc. A centrifugal weight forces the pressure plate and friction disc into engagement when in a desired install position. A locking device such as a shear pin retains the centrifugal weight in the desired installed position. A controller sends an electronic command to a system component, such as an engine, to disengage the locking device. In one example, the electronic command may be an engine speed command that is above an engine speed limit in a normal vehicle operating mode. Commanding the engine to run at a speed greater than the typical engine speed limit moves the centrifugal weight out of the desired installed position and shears the pin making the master clutch operational.

The inventive steps of installing a normally open clutch may include positioning clutch components of the master clutch in a desired position. The clutch components are locked in the desired position and the clutch is installed onto the engine. The normal vehicle operating mode is temporarily disabled, and a clutch install mode is activated. The clutch install mode may include an engine speed command that is above the engine speed limit of the normal vehicle operating mode. The clutch components are driven with the engine in the clutch install mode to unlock the clutch components. In one example, a shear pin is broken to free the centrifugal weight from the desired install position. Once the master clutch becomes operational, the normal vehicle operating mode is restored.

According the present invention provides a simple and cost effective device for maintaining alignment of friction discs of a normally open clutch assembly during assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
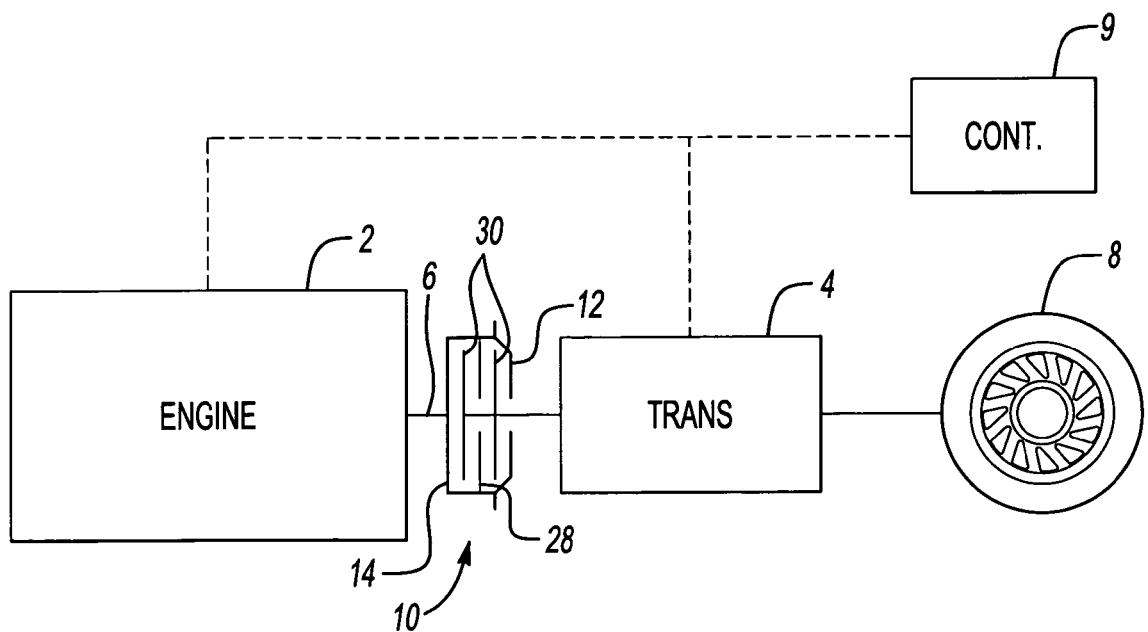
FIG. 1 is a schematic view of master clutch of a vehicle powertrain.

A powertrain is schematically shown in FIG. 1 and includes an engine 2 and a transmission 4. The engine 2 includes an output shaft for driving the transmission 4, which drives vehicle wheels 8, as known.

A controller 9 communicates with the engine 2 and transmission 4. The controller 9 commands the engine 2 and transmission 4 in response to parameters stored within the controller 9 and the operating conditions of the engine 2 and transmission 4. The powertrain typically operates in a normal vehicle operating mode. The normal vehicle operating mode may include, for example, engine speed limits to prevent full operating speed while at a stand still. As explained upon, such speed limits can make clutch installation difficult.

Figure 2:
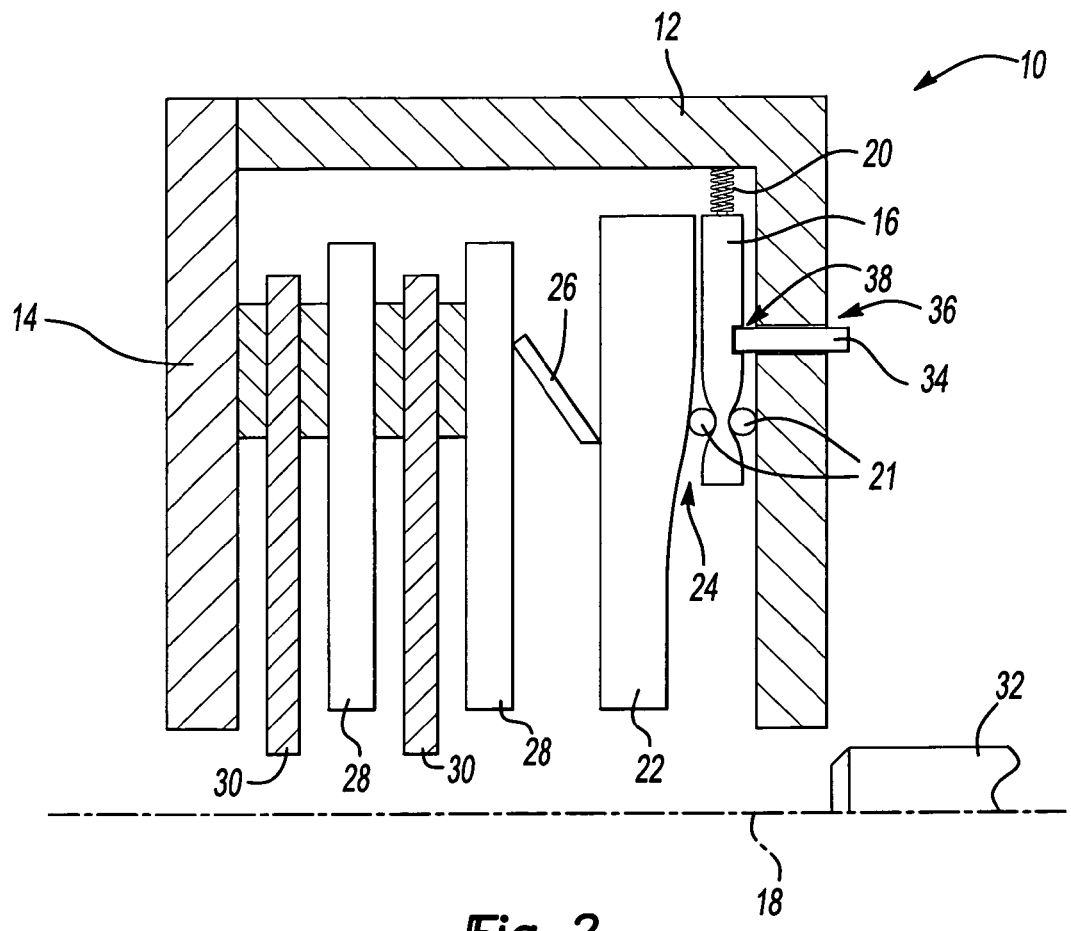
FIG. 2 is a cross-sectional view of an example clutch assembly including a positioning pin.

Referring to FIGS. 1 and 2, a clutch assembly 10 includes a clutch cover 12 attached to a flywheel 14. A plurality of centrifugal weights 16 are pivotally mounted within the clutch cover 12 and move radially outward in response to rotation of the clutch cover 12. Each centrifugal weight 16 is biased toward a central axis 18 by a biasing spring 20.

Rollers 21 are mounted to each centrifugal weight 16 and ride along surfaces of a ramp plate 22 and an inner surface of the clutch cover 12. The ramp plate 22 includes a ramped surface 24 on which the roller 21 moves to cause axial movement of the ramp plate 22. Axial movement of the ramp plate 22 is transmitted through a clamp spring 26 to pressure plates 28. Friction discs 30 are disposed between the pressure plates 28 such that axial movement of the pressure plates 28 clamps the friction discs 30 therebetween.

The biasing member 20 biases the centrifugal weight 16 toward the axis 18 such that the pressure plates 28 are not engaged to the friction discs 30. An alignment tool (not shown) such as a splined shaft is used to align the position of the friction discs 30 relative to the clutch cover 12 and flywheel 14. However, once the alignment tool is removed and prior to an input shaft 32 of the transmission 4 being installed into the clutch assembly 10, the friction plates 30 are not restrained and are free to move out of the set alignment.

One example clutch assembly 10 includes a plurality of pins 34 holding a corresponding plurality of centrifugal weights 16 in a position causing axial movement and thereby engagement between the pressure plates 28 and the friction discs 30. Each of the pins 34 hold a corresponding centrifugal weight 16 in a position causing application of a clamping force on the friction discs 30 that holds the friction discs 30 in the desired aligned position.

Figure 3:
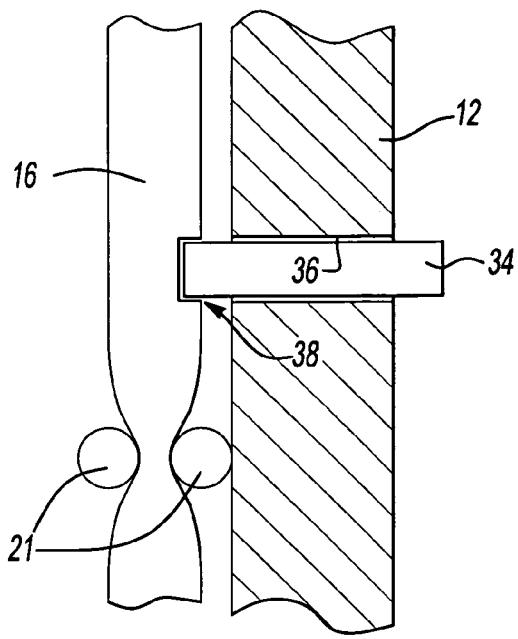
FIG. 3 is an enlarged cross-sectional view of the positioning pin shown in FIG. 2.

Referring to FIG. 3, each pin 34 extends through an opening 36 in the clutch cover 12 and into a cavity 38 defined within the centrifugal weight 16. The biasing spring 20 exerts a force holding the pin 34 against one side of the opening 36. The opening 36 for the clutch cover 12 may extend through the entire thickness of the clutch cover 12 or may be configured as a blind hole not extending entirely through the clutch cover 12. In one example, all the centrifugal weights 16 are held, however, it may only be required to hold selected centrifugal weights 16 to retain the friction discs 30 in a desired aligned position.

The pins 34 are intended for temporarily holding the centrifugal weights 16 during assembly, and prior to installation of the input shaft 32. The pin 34 is fabricated from a frangible material that shears in response to centrifugal force driving the centrifugal weights 16 radially outward.

Figure 4:
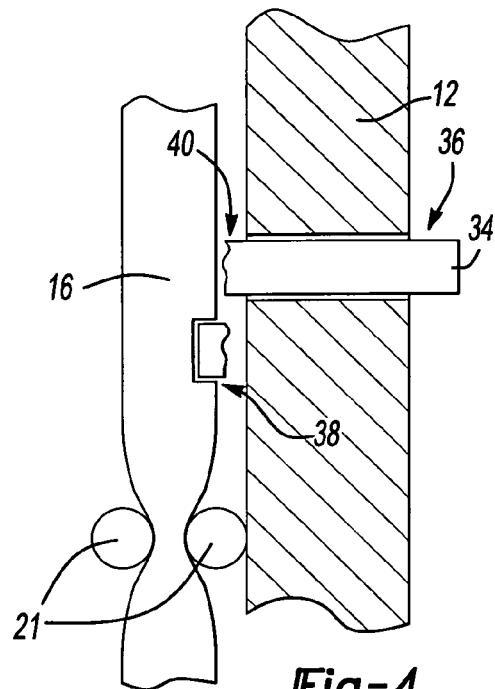
FIG. 4 is an enlarged cross-sectional view of the positioning pin shown in FIG. 3 after being sheared.
Figure 5:
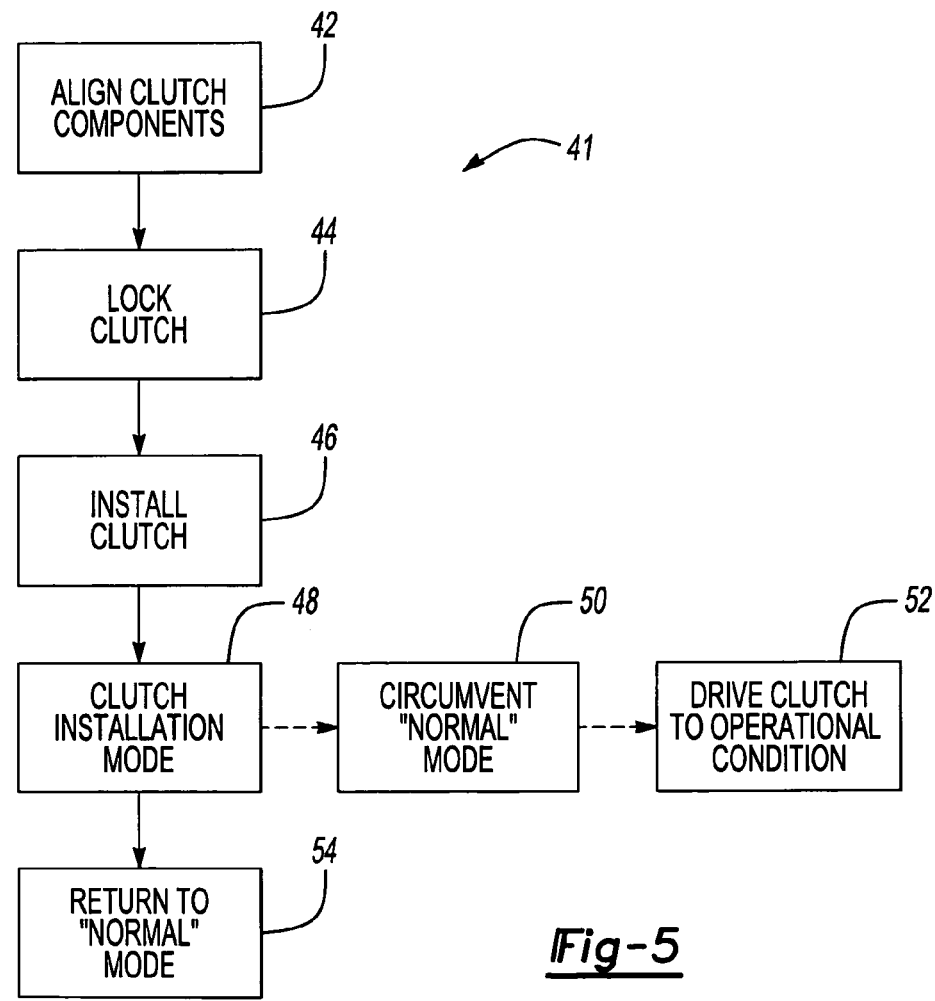
FIG. 5 is a flow chart depicting one example clutch installation method.

Referring to FIG. 4, assembly of the input shaft 32 to the clutch assembly 10 fixes the friction discs 30 in the desired aligned position. Accordingly, the pins 34 are no longer required to maintain friction disc 30 alignment. The pin 34 maintains position of the centrifugal weights 16 until the clutch assembly 10 is rotated to a speed that creates sufficient centrifugal force to shear the pin 34. The pin 34 shears along a shear plane 40 in response to the centrifugal force from the centrifugal weights 16. Once the pin 34 has sheared, the centrifugal weights 16 rotate freely responsive to rotation of the clutch assembly 10.

Residue from the pin 34 is simply dropped into the clutch assembly 10. As appreciated, the environment within the clutch assembly 10 includes residue from the friction discs 28. Additional residue and material from the pin 34 is substantially insignificant in comparison to the residue and debris found within the clutch assembly 10 and does not affect operation of the clutch assembly 10. The sheared remains of the pin 34 may contact one another sporadically during clutch operation. Such sporadic contact will shear and wear additional material from the sheared ends until such contact no longer occurs.

As described above, the clutch assembly 10 is rotated to a speed to create sufficient centrifugal force to shear the pin 34. However, for example, an engine speed limit in the normal vehicle operating mode may prevent the engine from being driven to a speed needed to shear the pin 34. To this end, the present invention provides a method to temporarily disable the normal vehicle operating mode.

In operation, clutch components of the clutch assembly 10 are aligned, as described above. In particular, the pin 34 is arranged to lock the centrifugal weight 16 to force the pressure plates 28 and friction discs 30 against one another.

The controller 9 temporarily disables the normal vehicle operating mode by activating a clutch install mode. The clutch install mode may be initiated in response to an input, such as performing an initiation sequence on a vehicle system. An operator can manipulate, for example, an ignition switch, shift lever, service brake, accelerator pedal, and/or cruise control switch in a particular sequence to request the controller 9 to enter the clutch install mode. In another example, the initiation sequence may be performed by installing a service tool into a communications port broadcasting a message to the engine 2 or transmission 4. In yet another example, diagnostic switches may be manipulated to send the message to the controller 9.

The controller 9 may also refer to different systems as part of the process of transitioning from the normal vehicle to clutch install mode as a check. The controller 9 could enter the clutch install mode in response to the initiation sequence, for example, by also referencing an engine mode, ABS mode, hours of operation, transmission mileage, and/or number of ignition cycles. If for example, the hours of operation, transmission mileage, and ignition cycles are zero, then the controller 9 will recognize that the clutch has not yet become operational and will enter the clutch install mode.

Once the clutch install mode is entered, the engine may be driven to the speed needed to unlock the locking device, such as by shearing the pin, so that the clutch becomes operational. The engine may be commanded to a desired speed by the controller 9 sending an engine speed, engine torque, engine speed limit, or engine torque limit command to the engine 2. Once the clutch become operational, the controller 9 will be restored to the normal vehicle operating mode.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of installing a normally open clutch comprising the steps of:
    a) positioning clutch components of a clutch in a desired position;
    b) locking the clutch components in the desired position and installing the clutch on an engine;
    c) temporarily disabling a normal vehicle operating mode for the engine and activating a clutch install mode;

d) driving the clutch components with the engine in the clutch install mode to unlock the clutch components; and e) restoring the normal vehicle operating mode.

2. The method according to claim 1, wherein the clutch components include a pressure plate, a friction disc, a centrifugal weight and a locking device, and step a) includes aligning the friction disc.

3. The method according to claim 2, wherein step b) includes holding the pressure plate and friction disc in engagement with one another using the centrifugal weight, and locking the centrifugal weight with the locking device.

4. The method according to claim 1, wherein step c) includes electrically initiating the clutch install mode in response to an input.

5. The method according to claim 4, wherein step c) includes performing an initiation sequence on a vehicle system.

6. The method according to claim 5, wherein the initiation sequence comprises manipulating an operator input device on a vehicle receiving the clutch and engine.

7. The method according to claim 5, wherein the initiation sequence comprises installing a service tool and broadcasting a message to the vehicle system with the service tool.

8. The method according to claim 7, wherein the vehicle system is a transmission.

9. The method according to claim 5, wherein the vehicle system is an electrical input device.

10. The method according to claim 1, wherein step c) includes activating the clutch installation mode by monitoring a vehicle condition indicative of the clutch not yet becoming operational.

11. The method according to claim 1, wherein step d) includes commanding the engine using one of an engine speed and engine torque command.

12. The method according to claim 1, wherein step d) includes commanding the engine using one of an engine speed limit and engine torque limit command.

13. The method according to claim 1, wherein step e) includes restoring the normal vehicle operating mode after a predetermined event occurs.

14. A master clutch for a vehicle comprising:
a pressure plate adjacent to a friction disc;
a centrifugal weight forcing the pressure plate and friction disc into engagement in a desired install position;
a locking device retaining the centrifugal weight in the desired install position; and
a controller sending an electronic command to a system component to disengage the locking device, permitting the centrifugal weight to move out of the desired install position.

15. The master clutch according to claim 14, wherein the system component is an engine, the electronic command in response to an input.

16. The master clutch according to claim 15, wherein the input initiates a clutch install mode that temporarily deviates from a normal vehicle operating mode.

17. The master clutch according to claim 16, wherein the normal vehicle operating mode includes an engine operating limit.

18. The master clutch according to claim 14, wherein the locking device is a shear pin.

* * * * *

UNITED STATES PATENT AND TRADEMARK OFFICE
CERTIFICATE OF CORRECTION

PATENT NO. : 7,314,430 B2  Page 1 of 1
APPLICATION NO. : 11/282930
DATED : January 1, 2008
INVENTOR(S) : DeVore et al.

It is certified that error appears in the above-identified patent and that said Letters Patent is hereby corrected as shown below:

ON THE TITLE PAGE ITEM [75]:

Inventor Loren C. Dreier's should read as: --Loren C. Dreier, Southern Pines, NC (US)--

Signed and Sealed this

Twenty-ninth Day of April, 2008

JON W. DUDAS
*Director of the United States Patent and Trademark Office*